G. FORNACA.
VALVE.
APPLICATION FILED AUG. 23, 1912.

1,076,412.

Patented Oct. 21, 1913.
3 SHEETS—SHEET 1.

WITNESSES
Thomas Howe
E. Guerion

Guido Fornaca,
INVENTOR

BY Edwards, Sager & Wooster,
ATTORNEYS.

G. FORNACA.
VALVE.
APPLICATION FILED AUG. 23, 1912.

1,076,412.

Patented Oct. 21, 1913.
3 SHEETS—SHEET 2.

WITNESSES
Thomas Howe
C. Galvin

Guido Fornaca,
INVENTOR
BY
Edwards, Sager & Wooster,
his ATTORNEYS.

G. FORNACA.
VALVE.
APPLICATION FILED AUG. 23, 1912.

1,076,412.

Patented Oct. 21, 1913.
3 SHEETS—SHEET 3.

WITNESSES
Thomas Howe
C. Galvion

Guido Fornaca
INVENTOR

BY Edwards, Sager & Wooster,
his ATTORNEYS.

UNITED STATES PATENT OFFICE.

GUIDO FORNACA, OF TURIN, ITALY.

VALVE.

1,076,412.  Specification of Letters Patent.  Patented Oct. 21, 1913.

Application filed August 23, 1912. Serial No. 716,581.

*To all whom it may concern:*

Be it known that I, GUIDO FORNACA, a subject of the King of Italy, residing at Turin, Italy, have invented certain new and useful Improvements in Valves, of which the following is a full, clear, and exact specification.

This invention relates to valves, and to the method of operating the same.

More particularly, this invention relates to valves having a reciprocating control element, the reciprocation of which is regulated by a cam member moving bodily in a direction transverse to the direction of reciprocation of the control element, and constructed for securing improved regulation with minimum frictional or other losses and avoiding shocks, noises, etc.

One method of carrying out my invention embodies the combination of a cam member mounted proximate a valve to reciprocate or oscillate and bodily engage at preferably tangential surfaces the movable element of the valve to move the same in its plane of movement transverse to the plane of reciprocation or oscillation of the cam member. In such preferred form of my invention, the movable element of the valve is provided with a roller and the engaging surface of the cam member is so constructed as to be tangential to the surface of the roller when actuating the movable element.

Other features and objects of my invention will be more fully understood from the following description and the accompanying drawings in which—

Figure 1:
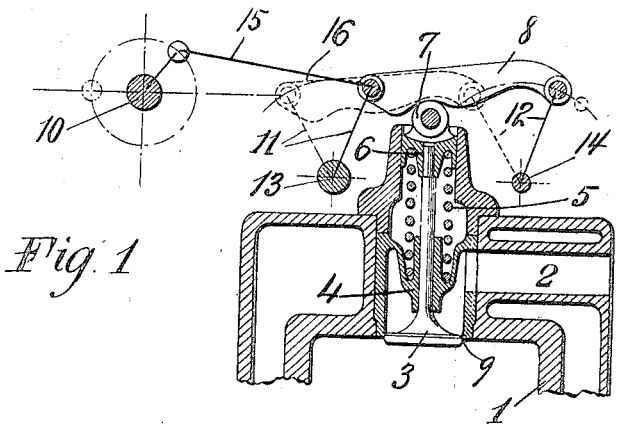
Figure 2:
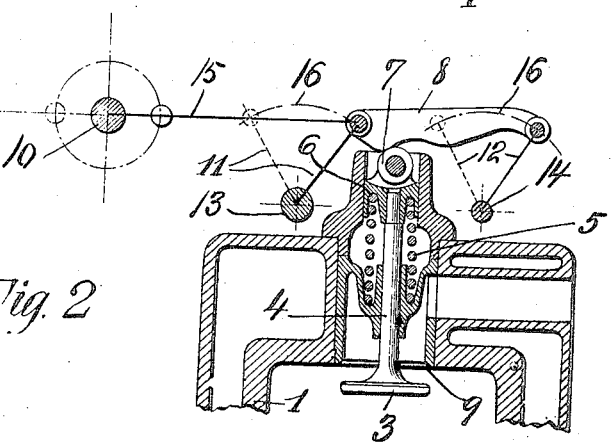
Figure 3:
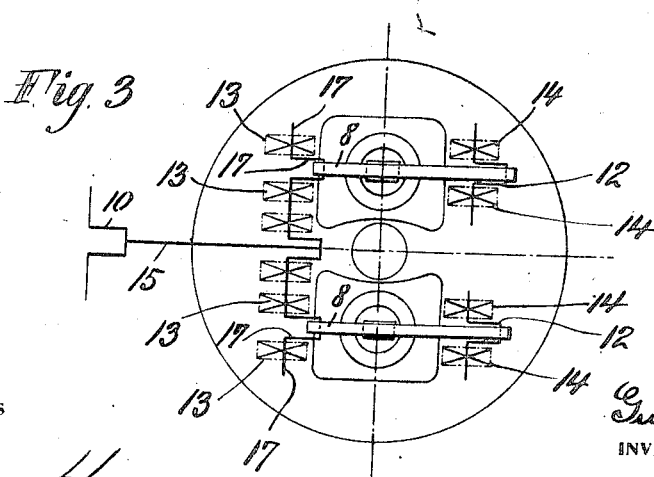
Figure 4:
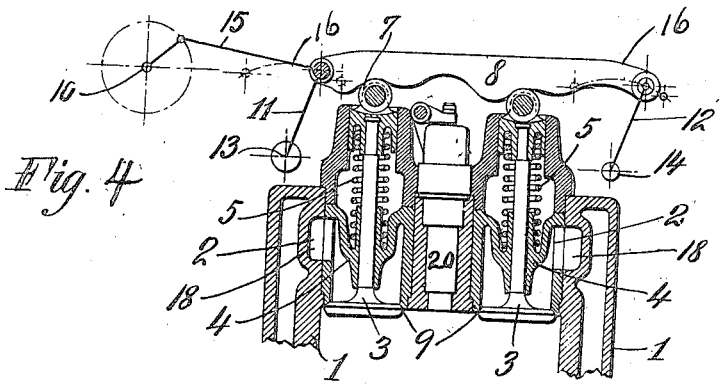
Figure 5:
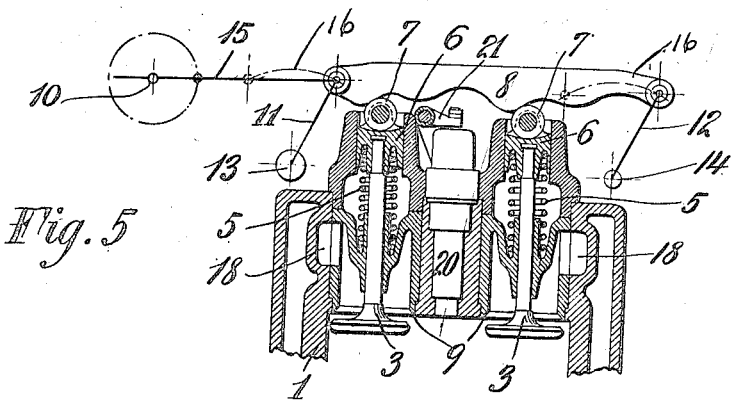
Figure 6:
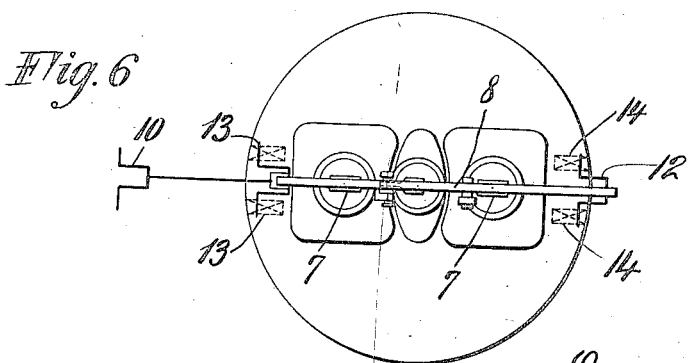
Figure 7:
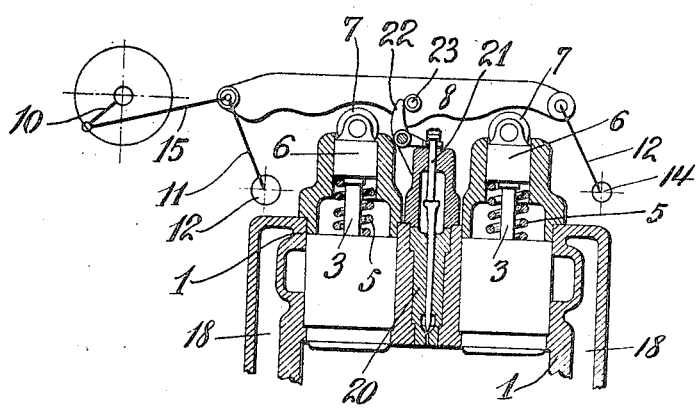
Figure 8:
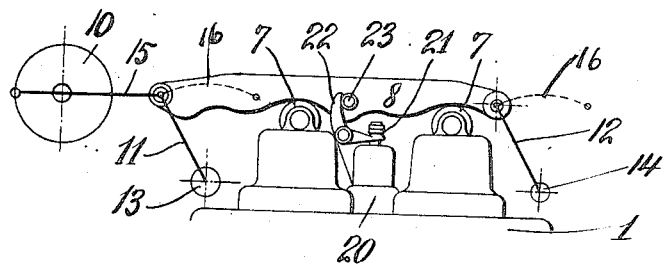

Figure 1 indicates in central sectional elevation a valve embodying my invention, the valve being shown in closed position; Fig. 2 is a like view of the valve shown in Fig. 1, but in open position; Fig. 3 indicates in plan two valves constructed and operated in accordance with my invention; Figs. 4 and 5 are central sectional elevations of two valves constructed and operated in accordance with my invention, the former showing the valves in closed position, and the latter showing the valves in open position; Fig. 6 represents diagrammatically a plan of three valves constructed and operated in accordance with my invention; and Figs. 7 and 8 are respectively a central sectional elevation and a side elevation of the device shown in Fig. 6, Fig. 7 showing the three valves in closed position, and Fig. 8 showing two valves in closed position, and the third in open position.

Referring to the structure shown in Figs. 1 and 2, the engine cylinder 1 is indicated as having the suction or exhaust passage 2 at the upper portion thereof. The particular engine cylinder illustrated is of the puppet valve internal combustion type. The inlet and exhaust valves are similar, and comprise a head 3 mounted on a stem guided by the centrally recessed bracket 4. The particular puppet valve illustrated is automatically closed by the spiral spring 5, one end of which is seated in a recess in the bracket 4, and the other end of which abuts the slide 6 carried by the other end of the valve stem. Coöperating with the roller 7 carried by the valve stem is a reciprocating or oscillating cam 8 having cam surfaces arranged to engage the roller for opening and closing the valve, as shown in Figs. 1 and 2. The actuation of the cam member 8 is controlled by the crank or eccentric shaft or the like, as will be understood. The configuration of the cam member 8 is such that the surface of the former is at all times tangential to the surface of the roller 7 at the point of contact. This relationship secures minimum friction between the roller and the cam member, and at the same time effects a positive reciprocation of the valve stem with minimum effort. As shown in Figs. 1 and 2, the valve member 8 is carried by parallel links 11, 12, pivoted at 13, 14, respectively, and actuated by the crank shaft 10 by link 15. The crank shaft 10 is driven at one half the speed of the main shaft, in a four cycle engine, and at the same speed in a two cycle engine. In operation, the cam member 8 swings bodily in the arc of a circle (indicated by a dot and dash line 16), the limits of which are indicated by full and dotted lines 11, 11, or 12, 12, which form the limiting radii of the arc 16. It will be noted that the engaging portion of the cam member 8 is formed of a laterally projecting portion which serves to open the valve (see Fig. 2); further, of an adjacent reëntrant portion, permitting the valve to be closed (see Fig. 1); further, of another projecting portion, extending a less distance downwardly than the first named projecting portion, but not causing the valve to be unseated; and finally, of an extreme lateral reentrant portion which also does not cause the valve to be opened.

In Fig. 3, the crank shaft 10 is connected by link 15 to the valve crank shaft 17, thereby reciprocating two cam members 8 from one crank, each valve and cam member being constructed as described above. In this case, the valves are arranged side by side longitudinally of the crank or control shaft 10, so that the crank shaft 11 serves to operate several valves. The engine indicated in Fig. 3 may be either of the four cycle or two cycle type, as explained above in connection with Figs. 1 and 2.

In Figs. 4 and 5 is shown a high speed two cycle engine, the valves 3, 3 serving to control the inflow of air or a gas mixture through the passages 18, 18 communicating with an outside compressor (not shown). The lower exhaust port is not shown; however, these details will be clear to those skilled in the art. In this particular type of engine the ratio of the speed of the crank shaft 10 relative to that of engine shaft will be unity. The cam member 8 having a double cam profile or engaging surface is mounted on parallel links 11, 12 and controls two valves in a manner similar to the operation of the before described arrangements. In the position indicated in Fig. 4 the double cam member 8 is moving toward the right after having passed its central position; and is about to force each valve head 3 to leave its seat 9. In the position shown in Fig. 5 the double cam member 8 has reached its extreme right hand position and both valves are opened to maximum extent. As remarked above, it is preferable to arrange the engaging surface of the cam member 8 so that at all points of contact the said surface of the cam member is tangential to the surface of each roller 7. In view of the arrangements shown in Figs. 3, 4 and 5, four valves may be simultaneously controlled by two double cam members 8 of the construction shown in Figs. 4 and 5 and operated by the crank shaft 10 and a valve crank shaft 17, such as shown in Fig. 3.

The engine indicated in Figs. 6, 7 and 8 is somewhat similar to that shown in Figs. 4 and 5. In Fig. 6 the crank shaft 10 and double cam member 8 have reached their extreme right-hand positions; in Fig. 7 the crank-shaft 10 and cam member 8 have passed through central position and have moved toward the left, the position shown in Fig. 8 being the extreme left hand position. It will be noted that the central needle valve 20 is controlled by the cam member 8 conjointly with the two puppet valves. The stem 21 of needle valve 20 is tripped at desired instants by the bell crank lever 22 by engagement with the roller 23 loosely carried by the cam member 8. In Fig. 7 the roller 23 has just come in contact with the engaging surface of bell crank lever 22, while in Fig. 8 the roller has moved along the said engaging surface of lever 22 to its limiting position and has pushed the needle valve stem 21 to its maximum open position. The engaging surface of bell crank lever 22 is preferably arranged to contact tangentially with the outer surface of roller 23. The inner valve 20 controls the supply of liquid fuel, whereas the puppet valves control the air supplied by passages 18 from an outside compressor, the exhaust port being disposed at a lower portion of the engine cylinder, as will be understood. Thus it will be seen that in Figs. 6, 7 and 8 the cam member 8 controls a plurality of valves operated at different instants, that is, of different phases.

Analogous to the arrangement of Fig. 3, four puppet valves and two needle valves, similar to those of Figs. 6, 7 and 8, may be operated by two double cam members 8 controlled by crank shaft 10 and valve crank shaft 17. In a similar manner, the number of conjointly actuated valves of different types and phases may be increased as may be desired. It will be clear that my invention is also applicable to multi-cylinder combustion engines.

My invention may be used also in operating valves of steam engines, turbines, gas engines, and other types of valve controlled engines and motors. When it is desired to employ my invention in reversing engines, it is merely necessary to mount the link 15 on the crank shaft 10 by means of a lost-motion element, whereby upon reverse rotation the crank shaft 10 will be shifted with respect to the link 15 through a sufficient angle to operate the valves at instants corresponding to the instants on forward movement as described above, the arrangement being otherwise the same as above set forth.

Having thus described my invention, what I declare as new, and desire to secure by Letters Patent of the United States, is:—

1. The combination of a valve having a reciprocating element, and controlling means therefor, said means comprising a cam element positively reciprocating said reciprocating element, links pivoted at fixed points carrying said cam element and means for oscillating said cam element in a direction transverse to the direction of reciprocation of said reciprocating element.

2. The combination of a valve having a movable element, and controlling means therefor, said means comprising a cam member, means for oscillating said cam member in a direction transverse to the direction of movement of the said element, and links pivoted at fixed points for supporting said cam member.

3. The combination of a valve having a spring controlled, reciprocating stem, a loosely mounted element thereon, an oscillating cam member constructed to engage said element to reciprocate said stem in one direction, and parallel links supporting said cam member.

4. The combination of a valve having a reciprocating element, a roller mounted at one end of the said element, and actuating means for said element, said means comprising an oscillating cam member, links pivoted at two points carrying said cam member, said cam member being adapted to engage said roller at certain positions.

5. The combination of a valve having a spring controlled valve stem, a roller mounted at one end of said stem, a cam member adapted to engage said roller for moving the said stem, and parallel motion links controlling the movement of said cam member.

6. The combination of a valve having a spring controlled valve stem, a roller mounted at one end of said stem, and a cam member pivoted at two points and adapted to engage said roller for moving the said stem to open position.

7. An engine comprising a valve having a movable element, a roller mounted at an external end of said element, a cam member pivoted at or near its ends and adapted to engage said roller to move said element, and means for oscillating said cam member.

8. An engine comprising a valve having a reciprocating element, a roller mounted at one end thereof, a plurality of links pivoted at one end at relatively fixed points and a cam pivoted to said links and adapted to engage said roller to move said element in one direction and means for oscillating said cam member in synchronism with the engine shaft.

9. An engine comprising a valve having a movable element and means for moving said element at predetermined instants, said means comprising a roller carried by said movable element, a cam member adapted to engage said roller at certain positions, and means for oscillating said cam member in synchronism with the engine shaft.

10. An engine comprising a valve having a movable element and means for moving said element at predetermined instants, said means comprising a roller carried by said movable element, a cam member adapted to engage said roller at certain positions, said member having an engaging surface tangential to the surface of the said roller for said certain positions of engagement, and means for oscillating said cam member in synchronism with the engine shaft.

11. In an engine, the combination of a poppet valve and a needle valve and common means for actuating the same at desired instants, said means comprising a member moving in a direction transverse to the movable elements of said valves.

12. In an engine, the combination of a plurality of valves having movable elements reciprocating in substantially parallel directions, and common means for actuating said movable elements, said means comprising a parallel motion cam member, and means for pivoting said cam member at two points.

13. In an engine, the combination of a plurality of valves having movable elements reciprocating in substantially parallel directions, rollers loosely carried by said movable elements, common means for actuating said movable elements, said means comprising an oscillating cam member adapted to engage said rollers for predetermined positions, the engaging surfaces of said member and said rollers being substantially tangential for said positions, and means for oscillating said cam member in synchronism with the engine shaft.

14. In an engine, the combination of a valve having a spring controlled valve stem, a roller mounted at one end thereof, an oscillating cam member pivoted at two points and having engaging surfaces adapted to engage said roller for predetermined positions to move said stem in opposition to the spring, and means for oscillating said cam member, said means comprising a pitman, one end of said pitman being rotated in synchronism with the engine shaft.

15. The combination with a valve having a reciprocatory element, of a cam member for reciprocating said element, and parallel motion links controlling the movement of said cam member, said cam member being disposed above said element and having a lower engaging portion determined by two downwardly projecting portions and an intermediate reëntrant portion, and means for pivoting said cam member at two points.

16. The combination with a plurality of valves disposed side by side and having movable elements reciprocated in substantially parallel directions, of a common cam member for controlling the opening and closing of said valves, and links pivoted at fixed points at one end and pivotally carrying said cam member, said cam member having a plurality of series of projections with intermediate reëntrant portions.

In testimony whereof I affix my signature, in presence of two witnesses.

GUIDO FORNACA.

Witnesses:
JOCELYN GLOUBERGRAN,
C. A. ANDRINA.

Copies of this patent may be obtained for five cents each, by addressing the "Commissioner of Patents, Washington, D. C."